United States Patent [19]

Gardipee

[11] 4,101,152

[45] Jul. 18, 1978

[54] FISHERMAN'S KNOT TYING JIG

[76] Inventor: Walter E. Gardipee, P.O. Box 2925, Missoula, Mont. 59801

[21] Appl. No.: 753,887

[22] Filed: Dec. 23, 1976

[51] Int. Cl.$^2$ .............................................. D03J 3/00
[52] U.S. Cl. .......................................... 289/17; 43/1; 43/4
[58] Field of Search ........................... 43/1, 4; 289/17

[56] References Cited

U.S. PATENT DOCUMENTS 2,758,858  8/1956  Smith, Sr. ................................. 43/1

FOREIGN PATENT DOCUMENTS 993,815  6/1965  United Kingdom .................. 289/17

Primary Examiner—Robert Peshock
Assistant Examiner—Robert P. Swiatek
Attorney, Agent, or Firm—Wells, St. John & Roberts

[57] ABSTRACT

A jig is disclosed that may be hand held and utilized to assist fishermen in tying a particular variety of knots that are utilized to fasten fishing line to a hook, lure, swivel or the like. The device is elongated with a tapered forward end leading to a blunt tip. An open line receiving cleft is formed in the blunt tip to receive a loop of the fishing line. An open notch is located rearwardly of the line receiving cleft. A number of outwardly projecting pegs straddle the open notch. The pegs are utilized to hold the fishing line in a particular, looped condition while the line is wrapped several times about the tapered end. The line free end, after being wound about the tapered end, is threaded through a bight (formed by the pegs) and the notch located there between. The line is easily removed from the jig and the knot may be tightened simply by holding both ends of the line and pulling on the attached hook, swivel, etc.

9 Claims, 4 Drawing Figures

FISHERMAN'S KNOT TYING JIG

BACKGROUND OF THE INVENTION

The present invention is related to line tying jigs and more particularly to hand held jigs for tying such knots utilized by fishermen in tying various appliances and attachments to fishing line.

The tying of knots often seems to require three hands, one to hold the line, one to hold the attachment, and the other to tie the knot. This problem is aggravated by cold weather and numb fingers. Fishermen with arthritic hands also have difficulty tying the usual knots without pain and frustration. The present invention was developed to assist two handed fishermen in tying quick effective knots. The invention is embodied in a jig that functions both as a "third hand" and as a tool to assist the fisherman in correctly and consistently tying effective knots. The form of knot capable of being tied by using the present jig is a type of stevedore's hitch, termed a fisherman's slip knot. Variations of the knot are commonly utilized to tie attachments to fishing line, e.g. hooks, swivels, sinkers, etc. The jig, line, and attachment may be held by one hand with the remaining hand free to perform the knot tying functions without requiring that hand to also hold the attachment being tied to the line.

A primary object of the present invention is to provide a knot tying jig for fishermen in which attachments may be easily and quickly tied by effective, efficient knots to the end of fishing lines.

Another object is to provide such a jig that is small enough to be hand held and easily carried in a pocket or tackle box.

A still further object is to provide such a jig that is simple in construction and inexpensive to manufacture and purchase.

A still further object is to provide such a jig that may be utilized as efficiently by left or right handed fishermen.

These and still further objects and advantages will become apparent upon reading the following detailed description which, taken with the accompanying drawings, disclose a preferred form of my invention. It is to be understood however that the drawings and description set forth only a preferred example of my invention and are not set forth to define particular restrictions upon the scope of my invention. The scope is set forth only by the claims found at the end of this specification.

BRIEF DESCRIPTION OF THE DRAWINGS

A preferred form of the present invention is set forth in the accompanying drawings wherein.

BRIEF DESCRIPTION OF A PREFERRED EMBODIMENT

Figure 3:
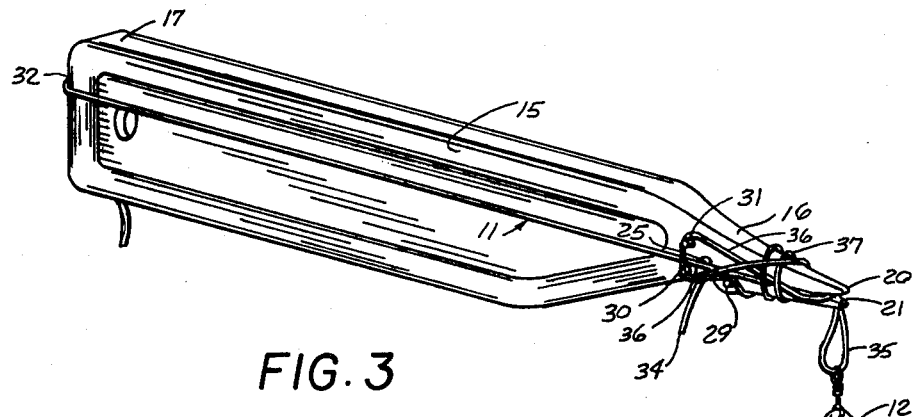
FIG. 3 is a pictorial view illustrating the present jig in operation along with a fishing lure and fishing line.

A preferred form of the present jig is illustrated in the accompanying drawings and is generally designated therein by the reference character 10. The jig 10 is hand held and operates upon fishing line 11 for the purpose of assisting the fisherman in attaching a hook, lure, or other line attachment securely to the line. Specifically, the jig is utilized to aid the fisherman in tying knots 13 of the form shown. This knot 13 is shown in particular detail by FIG. 4. It is a form of "stevedore's hitch" or "fisherman's slip knot". The arrangement of the line about the jig to form the knot 13 is shown in FIG. 3. It is entirely conceivable that other forms and variations of the knot 13 may be tied through the assistance of the present jig 10.

The jig 10 is formed of an elongated relatively flat body 15. It is preferably formed of molded synthetic resin and is particularly adapted for mass production. The body 15 includes a forward end 16 and a rearward end 17. Ends 16 and 17 are spaced longitudinally apart by a left hand side surface 18 and right hand side surface 19. The forward body end 16 is tapered to a blunt tip 20.

The blunt tip 20 includes an open line receiving cleft 21. Cleft 21 is V-shaped and formed within the tip 20 to receive and securely hold a doubled over line as shown in FIG. 3. The orientation of line receiving cleft 21 is such that the opening is located at the very end of the jig while the closed end or vertex of its V configuration points toward the rearward jig end 17. Cleft 21 is formed completely through the thickness of the jig 10.

An open notch 25 is formed within the body 15 rearward of the line receiving cleft 21. Open notch 25 is oriented substantially transverse to the orientation of cleft 21. Notch 25 opens at a downward end 26 and is closed at an upward end 27.

Situated about the open notch 25 are a number of pegs that are utilized to guide and hold the fishing line in a particular looped configuration to assist in forming the knot. The pegs are identical on both sides of the body and project outwardly therefrom. A first peg 29 thus extends outwardly on both sides of the body 15 slightly forward of the open notch 25. Peg 29 is located forwardly adjacent to the open notch end 26. A second peg 30 also projects from opposite sides of the body 15. It is located rearwardly adjacent the notch open end 26. A third peg 31 also projects from opposite sides of the body 15. It is located in substantial transverse alignment with the second peg 30 (relative to the longitudinal dimension of body 15). Peg 31 is situated at a rearwardly adjacent position relative to the notch closed end 27.

The rearward end 17 of body 15 includes a groove 32. Groove 32 is in substantial longitudinal alignment with the open line receiving cleft 21. It is utilized to hold the line in place as shown in FIG. 3.

Figure 1:
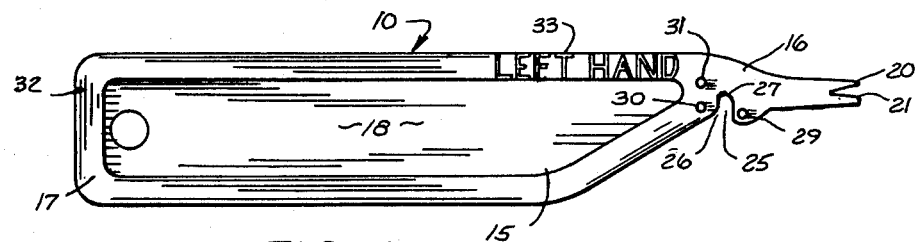
FIG. 1 is a side elevational view of the present jig.
Figure 2:
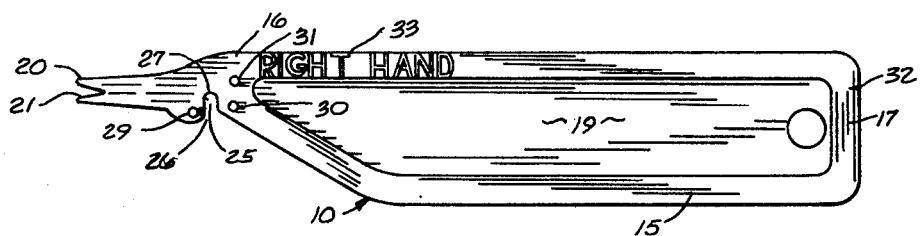
FIG. 2 is an elevational view illustrating the side opposite the side shown in FIG. 1.

Indicia 33 is provided on the opposite sides 18 and 19 to indicate the appropriate hand to use in holding the jig while tying a knot. Thus, a left-handed fisherman would hold the jig as shown in FIG. 1 with the thumb of his left hand resting lightly against the side 18. A right-handed fisherman would hold the jig with his right hand and the thumb thereof resting on the side 19 as indicated by indicia 33.

Prior to using the present invention, the fisherman must first thread the free end 34 of the line 11 through the eyelet of the desired attachment. He then pulls a sufficient amount of the line through the eye to tie the knot. Six or eight inches of line is usually appropriate. He then folds the line at the eye onto itself to form a first bight 35. Both strands of bight 35 are then inserted within the line receiving cleft 21 and pulled to one side such that the attachment 12 is closely adjacent to the blunt tip 20. In this condition both lengths of line (leading from attachment 12) extend along one side (side 18 in FIG. 3) of the jig.

The portion of the line running back to the fishing reel is secured to the jig by pulling it into engagement with the rearward groove 32. This holds the line secure while the remainder of the knot is being tied. The line free end 34 is then grasped in one hand while the other holds the jig body.

The line portion leading from the free end 34 to the line receiving cleft 21 is then trained rearwardly over the third peg 31. From peg 31, the line is trained downwardly under second peg 30. The fisherman then guides the line upwardly from peg 30 over first peg 29 in the fashion shown in FIG. 3. These steps are taken to form the line into a second bight 36. Once this is done, a number of windings 37 may be made about the tapered forward jig end 16. Usually two or three windings are sufficient. After this is accomplished, the fisherman then inserts the free end 34 back through the second bight 36 at the open notch 25. Notch 25 facilitates threading of the free end through second bight 36.

Figure 4:
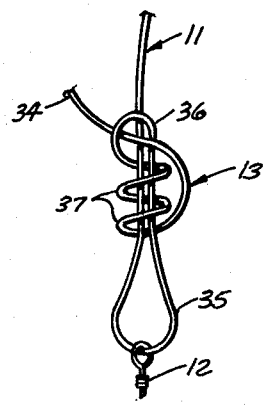
FIG. 4 is a diagrammatic view illustrating a typical knot that may be tied by utilizing the present jig.

The above steps are all that are required to form the basic knot configuration shown in FIG. 4. To remove the line from the jig, the fisherman simply holds both sections of line in one hand while simultaneously pulling both laterally away from the pegs. This pulls the second bight 36 from engagement with the pegs and allows the windings 37 to slide off the tapered tip. Then, by holding both ends of the line and pulling on the attachment, the knot will tighten and slide against the eye of the attachment. The final step is to trim off the excess length of line at the free end 34. A secure knot has been formed.

It may have become evident that various changes and modifications may be made in view of the above description and attached drawings. It is again noted, however, that this description and the drawings are not given to place definite restrictions on my invention. Only the following claims are to be taken as restrictions upon the scope of my invention.

What I claim is:

1. A hand held jig for tying fisherman's knots, comprising:

an elongated body having a forward end and a rearward end with side surfaces extending therebetween;

said forward end being tapered to a tip;

an open receiving cleft longitudinally formed in the tip to receive a first line bight of a fishing line and enable a free end of the fishing line to be wrapped about the tapered forward end;

two longitudinally spaced pegs projecting outward of the body from one side surface rearward of the cleft for enabling the free end of the fishing line to form a second line bight about the two pegs; and an open notch formed transversely in the body between the two pegs for enabling the free end of the fishing line to be inserted into the notch and through the second line bight between the two pegs.

2. The hand held jig as defined in claim 1 wherein the two pegs also project outwardly from a side surface opposite the one side surface.

3. The hand held jig as defined in claim 1 wherein the body includes a rearward line receiving groove formed within the rearward body end.

4. The hand held jig as defined in claim 1 comprising a third peg projecting outward of the body from the one side surface spaced from the two pegs and adjacent the notch for enabling the free end of the fishing line to be entrained about the two pegs and third peg in forming the second line bight.

5. The hand held jig as defined in claim 4 wherein the third peg is situated adjacent a closed end of the open notch and one of the two pegs is situated adjacent an open end of the notch.

6. The hand held jig as set out in claim 4 wherein:

the first, second and third pegs also project outwardly from a side surface of the body opposite the one side surface;

the body includes a rearward line receiving groove at its rearward end; and the third peg is situated rearwardly adjacent the closed end of the open notch.

7. The hand held jig as defined in claim 1 wherein the open line receiving cleft is substantially V shaped to receive and securely hold a fishing line therein.

8. The hand held jig as set out by claim 1 wherein the open notch is sufficiently large to allow free unrestricted passage of a fishing line therethrough.

9. The hand held jig as set out in claim 1 further comprising indicia on opposite sides of the body for indicating to the user which hand he should use in holding the jig.

* * * * *